United States Patent
Semnani

(10) Patent No.: US 12,523,729 B1
(45) Date of Patent: Jan. 13, 2026

(54) DEVICE LOCALIZATION USING MESH MAPPING

(71) Applicant: Taymour Semnani, Salt Lake City, UT (US)

(72) Inventor: Taymour Semnani, Salt Lake City, UT (US)

( * ) Notice: Subject to any disclaimer, the term of this patent is extended or adjusted under 35 U.S.C. 154(b) by 0 days.

(21) Appl. No.: 17/074,593

(22) Filed: Oct. 19, 2020

Related U.S. Application Data

(60) Provisional application No. 62/916,655, filed on Oct. 17, 2019.

(51) Int. Cl.
*G01S 1/68* (2006.01)
*H04W 4/02* (2018.01)
*H04W 4/33* (2018.01)

(52) U.S. Cl.
CPC ............ *G01S 1/68* (2013.01); *H04W 4/023* (2013.01); *H04W 4/33* (2018.02)

(58) Field of Classification Search
CPC ............ H04W 4/023; H04W 4/33; G01S 1/68
See application file for complete search history.

(56) References Cited

U.S. PATENT DOCUMENTS

| | | | | |
|---|---|---|---|---|
| 10,499,194 B1* | 12/2019 | Tyagi | ................... | H04B 17/318 |
| 2012/0003993 A1* | 1/2012 | Leino | ................... | G06F 16/9537 |
| | | | | 455/456.1 |
| 2014/0018096 A1* | 1/2014 | Jagannath | ................ | H04W 4/33 |
| | | | | 455/456.1 |
| 2014/0045518 A1* | 2/2014 | Sathyan | ................ | H04W 4/023 |
| | | | | 455/456.1 |
| 2014/0269391 A1* | 9/2014 | Hansen | ................... | G01S 13/74 |
| | | | | 370/252 |
| 2015/0133167 A1* | 5/2015 | Edge | ..................... | H04W 4/025 |
| | | | | 455/456.3 |
| 2015/0181384 A1* | 6/2015 | Mayor | .................. | H04W 24/02 |
| | | | | 455/456.1 |
| 2015/0341331 A1* | 11/2015 | Weksler | .................. | H04L 63/08 |
| | | | | 726/4 |
| 2016/0171777 A1* | 6/2016 | Todeschini | ............ | G06T 19/006 |
| | | | | 345/633 |
| 2017/0300970 A1* | 10/2017 | Yoder | ................ | G06Q 30/0259 |
| 2019/0075540 A1* | 3/2019 | Liou | ....................... | H04B 17/27 |
| 2019/0242989 A1* | 8/2019 | Lee | ......................... | G01S 5/0289 |
| 2019/0273777 A1* | 9/2019 | Virani | ................... | H04L 67/303 |
| 2020/0110149 A1* | 4/2020 | Reed | ..................... | H04W 4/025 |

\* cited by examiner

*Primary Examiner* — Steven S Kelley
(74) *Attorney, Agent, or Firm* — VLP Law Group, LLP

(57) ABSTRACT

Systems and methods for device localization using mesh mapping are described. In an example implementation, a method includes receiving a first location data point from a first computing device in real-time, receiving a plurality of mapping points from the first computing device, the mesh mapping points representing ranges between the first computing device and one or more beacons, generating a mesh mapping using the plurality of mapping points, determining that the first location data point from the first computing device exceeds a threshold accuracy using the mesh mapping, and mapping the first location data point relative to a location data point of a second computing device based on the first location data point exceeding a threshold accuracy.

17 Claims, 8 Drawing Sheets

DEVICE LOCALIZATION USING MESH MAPPING

CROSS-REFERENCE TO RELATED APPLICATIONS

The present application claims the benefit under 35 U.S.C. § 119(e) of U.S. Provisional Patent Application Ser. No. 62,916,655, titled "Device Localization Using Immediate Proximity", filed on Oct. 17, 2019, the entire contents of each of which are incorporated by reference.

BACKGROUND

The present disclosure relates to device localization using mesh mapping.

Tracking a location of a device using location sensors is becoming more common as mobile devices are built with location sensors. These location sensors can approximate a location in latitude and longitude coordinates for the mobile device and that location can be used for various applications. The location sensors can receive the latitude and longitude coordinates connecting with satellite networks, such as the GPS satellite network. In other solutions, the location sensors can ping signals off of cellular towers and triangulate the location of the location sensors. These location sensors have been shown to be accurate to within 10-15 feet while outdoors where signal propagation is unaffected between the location sensors and the GPS satellite network or cellular towers. However, when the signal propagation is blocked or obstructed, such as when the location sensor is within a building, the accuracy of the location sensors as affected and the location is not reliable data for various applications. The existing approaches are not able to accurately gather device localization using the location sensors because the accuracy of the location sensors suffers when the location sensors are within buildings or otherwise obstructed form clear line of sight with the GPS satellite network or cellular towers.

SUMMARY

According to one innovative aspect of the subject matter in this disclosure, a method for device localization using mesh mapping is described. In an example implementation, a method includes receiving a first location data point from a first computing device in real-time; receiving a plurality of mesh mapping points from the first computing device, the mesh mapping points representing ranges between the first computing device and one or more beacons; generating a mesh mapping using the plurality of mesh mapping points; determining that the first location data point from the first computing device exceeds a threshold accuracy using the mesh mapping; and mapping the first location data point relative to a location data point of a second computing device based on the first location data point exceeding a threshold accuracy. Other implementations include corresponding computer systems, apparatus, and computer programs recorded on one or more computer storage devices, each configured to perform the actions of the methods.

Implementations may include one or more of the following features. The method where the first location data point is a latitude and longitude coordinate. The method where the ranges between the first computing device and the one or more beacons represent signal strengths between a transmitted identifier of each of the one or more beacons and the computing device. The method where the signal strengths between the transmitted identifier of each of the one or more beacons and the computing device are received using one or more of a Bluetooth Low Energy device and an ultra-wideband Bluetooth device. The method where generating the mesh mapping further may include: filtering out the ranges between the first computing device and the one or more beacons that do not satisfy a signal strength threshold; identifying a proximate distance between each of the remaining ranges between the first computing device and the one or more beacons; and generating a mesh mapping overlay that reflects the range of each of the remaining ranges and the first computing device. The method where the proximate distance for each of the remaining ranges is categorized as one of immediate, near, and far. The method where determining that the first location data point from the first computing device exceeds a threshold accuracy using the mesh mapping further may include: overlaying the mesh mapping on a mapping area of a tracking area; determining an expected location of the first computing device using the ranges between the first computing device and the one or more beacons; comparing the expected location of the first computing device to the first location data point; and determining that the comparison between the expected location of the first computing device and the first location data point satisfies a threshold accuracy threshold. The method may include: responsive to determining that the comparison between the expected location of the first computing device and the first location data point does not satisfy the threshold accuracy threshold, identifying the first location data point as an inaccurate location data point. The method where the location data point of the second computing device is received in a same period of time as the first location data point and where mapping the first location data point relative to the location data point further may include: mapping the first location data point in a map of a tracking area; determining a relative location of the second computing device from the mesh mapping; and mapping a location of the second computing device using the relative location of the second computing device from the mesh mapping.

One general aspect includes a system may include: a processor; and a memory storing instructions that, when executed, cause the system to perform instructions including: receiving a first location data point from a first computing device in real-time; receiving a plurality of mapping points from the first computing device, the mesh mapping points representing ranges between the first computing device and one or more beacons; generating a mesh mapping using the plurality of mapping points; determining that the first location data point from the first computing device exceeds a threshold accuracy using the mesh mapping; and mapping the first location data point relative to a location data point of a second computing device based on the first location data point exceeding a threshold accuracy.

Implementations may include one or more of the following features. The system where the ranges between the first computing device and the one or more beacons represent signal strengths between a transmitted identifier of each of the one or more beacons and the computing device. The system where the signal strengths between the transmitted identifier of each of the one or more beacons and the computing device are received using one or more of a Bluetooth Low Energy device and an ultra-wideband Bluetooth device. The system where generating the mesh mapping further may include: filtering out the ranges between the first computing device and the one or more beacons that do not satisfy a signal strength threshold; identifying a proximate distance between each of the remaining ranges between the first computing device and the one or more beacons; and generating a mesh mapping overlay that reflects the range of each of the remaining ranges and the first computing device. The system where the proximate distance for each of the remaining ranges is categorized as one of immediate, near, and far. The system determining that the first location data point from the first computing device exceeds a threshold accuracy using the mesh mapping further may include: overlaying the mesh mapping on a mapping area of a tracking area; determining an expected location of the first computing device using the ranges between the first computing device and the one or more beacons; comparing the expected location of the first computing device to the first location data point; and determining that the comparison between the expected location of the first computing device and the first location data point satisfies a threshold accuracy threshold. The system where the memory further stores instructions that when executed, cause the system to: responsive to determining that the comparison between the expected location of the first computing device and the first location data point does not satisfy the threshold accuracy threshold, identifying the first location data point as an inaccurate location data point. The system where the location data point of the second computing device is received in a same period of time as the first location data point and where mapping the first location data point relative to the location data point further may include: mapping the first location data point in a map of a tracking area; determining a relative location of the second computing device from the mesh mapping; and mapping a location of the second computing device using the relative location of the second computing device from the mesh mapping.

One general aspect includes method that may include: receiving from a location sensor of a computing device, a location point, the location point identifying a latitude coordinate and a longitude coordinate reflecting a location of the computing device; determining if a location application is operating in one of a foreground and a background of the computing device and responsive to determining that the location application is operating in the foreground, advertising beacon data of the computing device to a proximate beacon device and calculating a distance between the computing device and the proximate beacon device using the advertised beacon data, responsive to determining that the location application is operating in the background, reading an RSSI value from the computing device associated with the proximate beacon device and calculating the distance between the computing device and the proximate beacon device using the RSSI value; sending the distance between the computing device and the proximate beacon device to a mapping server; and receiving a location determination from the mapping server, the location determination indicating if the location point received from the location sensor satisfies an accuracy threshold by comparing the distance between the computing device and the proximate beacon device in a mesh mapping.

Implementations may include one or more of the following features. The method where the proximate beacon device is a BLE device that is capable of broadcasting an identity. 20. The method where the location determination indicating if the location point received from the location sensor satisfies an accuracy threshold is an indication of whether the location point reflects a real-world location of the computing device.

Other implementations of one or more of these aspects and other aspects described in this document include corresponding systems, apparatus, and computer programs, configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
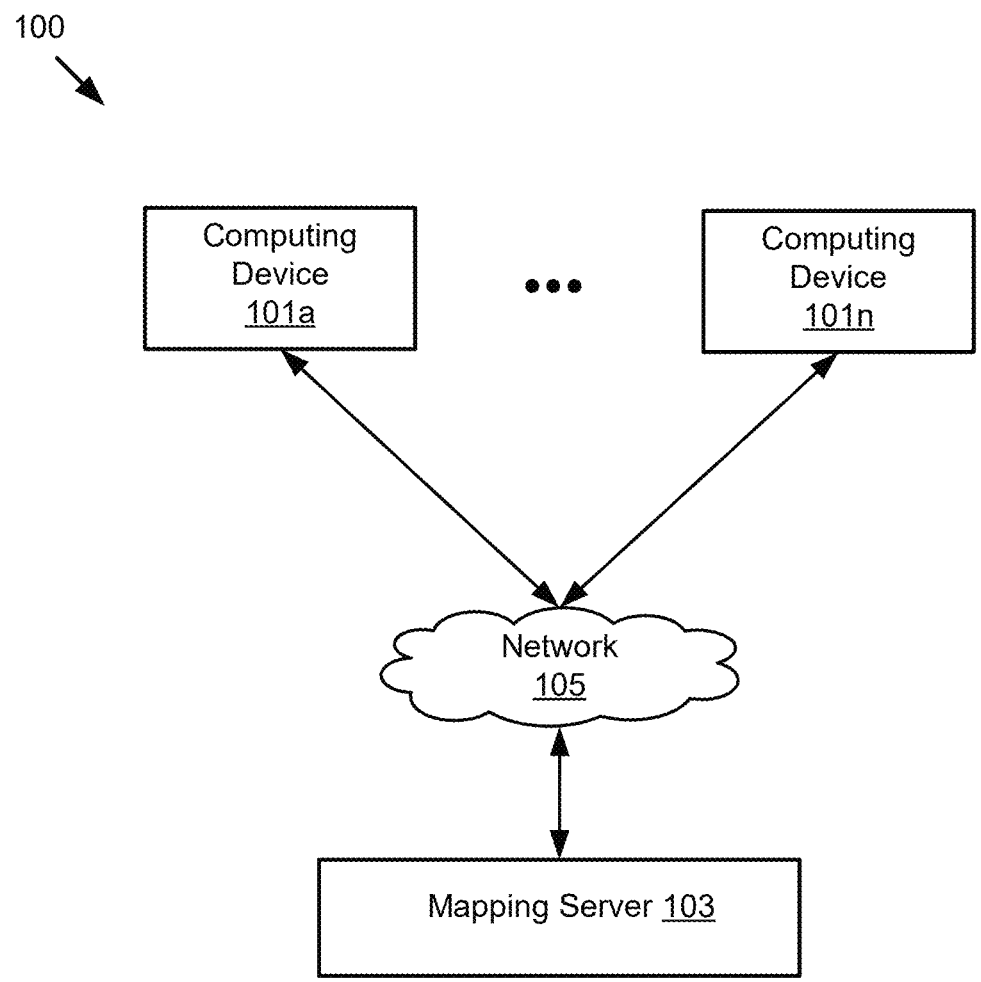
FIG. 1 is a block diagram illustrating an example computer system for device localization using mesh mapping.

The technology described herein provides systems and methods for device localization using mesh mapping. In addition to the described technology, other technologies are also described and contemplated herein. FIG. 1 is a block diagram illustrating an example computer system 100 for real-time mapping using device localization using mesh mapping. With reference to FIG. 1, a user may be using a computing device 101a connected to a mapping server 103 via a network 105. As the user moves through an area, the mapping server 103 may receive location data, reflecting the real-world location of the user. The location data may be related to a location point of the computing device 101a. The mapping server may use the location data and mesh mapping data in order to determine the location of the computing device 101a with a higher degree of accuracy than just using the location data alone.

In further implementations, the mapping server 103 may receive location data and mesh mapping data collected from other computing devices 101n in real-time and also map that location data and mesh mapping data in order to provide a highly accurate device location for each of the computing devices 101a-101n in the area. The mapping server 103 may generate a mapping mesh based on mesh mappings of each of the computing devices 101a-101n and use the mesh mapping to identify one or more accurate device location data points and use that accurate device location data point to infer the locations of the other computing devices 101a-101n. By using this accurate device location data point from the mesh mapping, a computing device 101 may be tracked through an area where using location sensors alone (such as GPS coordinates) would be unable to provide an accurate location.

In further implementations, the mapping server 103 may then generate a geohash of the location data. In further implementations, the geohash of the location data may be used to generate a heat map using the accurate device location data point and the inferred locations of the other computing devices 101a-101n at specific points in time. The mapping server 103 may analyze the heat map to make location determinations based on the flow of the location data and changes in the location data in real-time, such as locations of bottlenecks and throughputs of users. In some implementations, the location determinations may include location of crowds, flow and/or movement of users through the map, routes and/or throughputs a user may use to navigate to different positions, estimated wait-times between two points, closures or access points, alternate routes, etc. By performing geohashing in real-time, the mapping server 103 may provide real-time guidance and updates to a user on how long a wait-time will be, an alternate route to a location, and many other useful determinations that can provide the user with information in real-time of events happening in an area.

The computing device 101 included in the example configuration 100 may be used by a user. Example computing devices 101 may include, but are not limited to, mobile phones (e.g., feature phones, smart phones, etc.), tablets, laptops, desktops, netbooks, media streaming devices, portable media players, navigation devices, personal digital assistants, wearable devices (e.g., smart watches, fitness trackers, connected clothing, etc.) etc.

The computing devices 101a . . . 101n (also referred to individually and collectively as 101) are computing devices having data processing and communication capabilities. For instance, a computing device 101 may include a processor (e.g., virtual, physical, etc.), a memory, a power source, a network interface, and/or other software and/or hardware components, such as front and/or rear facing cameras, display, graphics processor, wireless transceivers, keyboard, camera, sensors, firmware, operating systems, drivers, various physical connection interfaces (e.g., USB, HDMI, etc.), and/or geolocation sensors. The computing devices 101a . . . 101n may couple to and communicate with one another and the other entities of the system 100 via the network 105 using a wireless and/or wired connection. While two or more computing devices 101 are depicted in FIG. 1, the system 100 may include any number of computing devices 101. In addition, the computing devices 101a . . . 101n may be the same or different types of computing devices.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the device 101 and the mapping server 103, in practice one or more networks 105 can be connected to these entities.

In some implementations, the system 100 includes a mapping server 103 coupled to the network 105. In some implementations, the mapping server 103 may be either a hardware server, a software server, or a combination of software and hardware. The mapping server 103 may be, or may be implemented by, a computing device including a processor, a memory, applications, a database, and network communication capabilities. In the example of FIG. 1, the components of the mapping server 103 are configured to implement a mapping application 310 described in more detail below. In one implementation, the mapping server 103 provides location determinations to a user of a computing device 101.

In some implementations, the mapping server 103 sends and receives data to and from other entities of the system 100 via the network 105. For example, the mapping server 103 receives location data from the computing device 101 and sends location determinations to the computing device 101. In further implementations, mapping server 103 may send information to the computing device 101 that the computing device 101 can use to display the location determinations in a graphical user interface. Although only a single mapping server 103 is shown in FIG. 1, it should be understood that there may be any number of mapping servers 103 or a server cluster.

Figure 2:
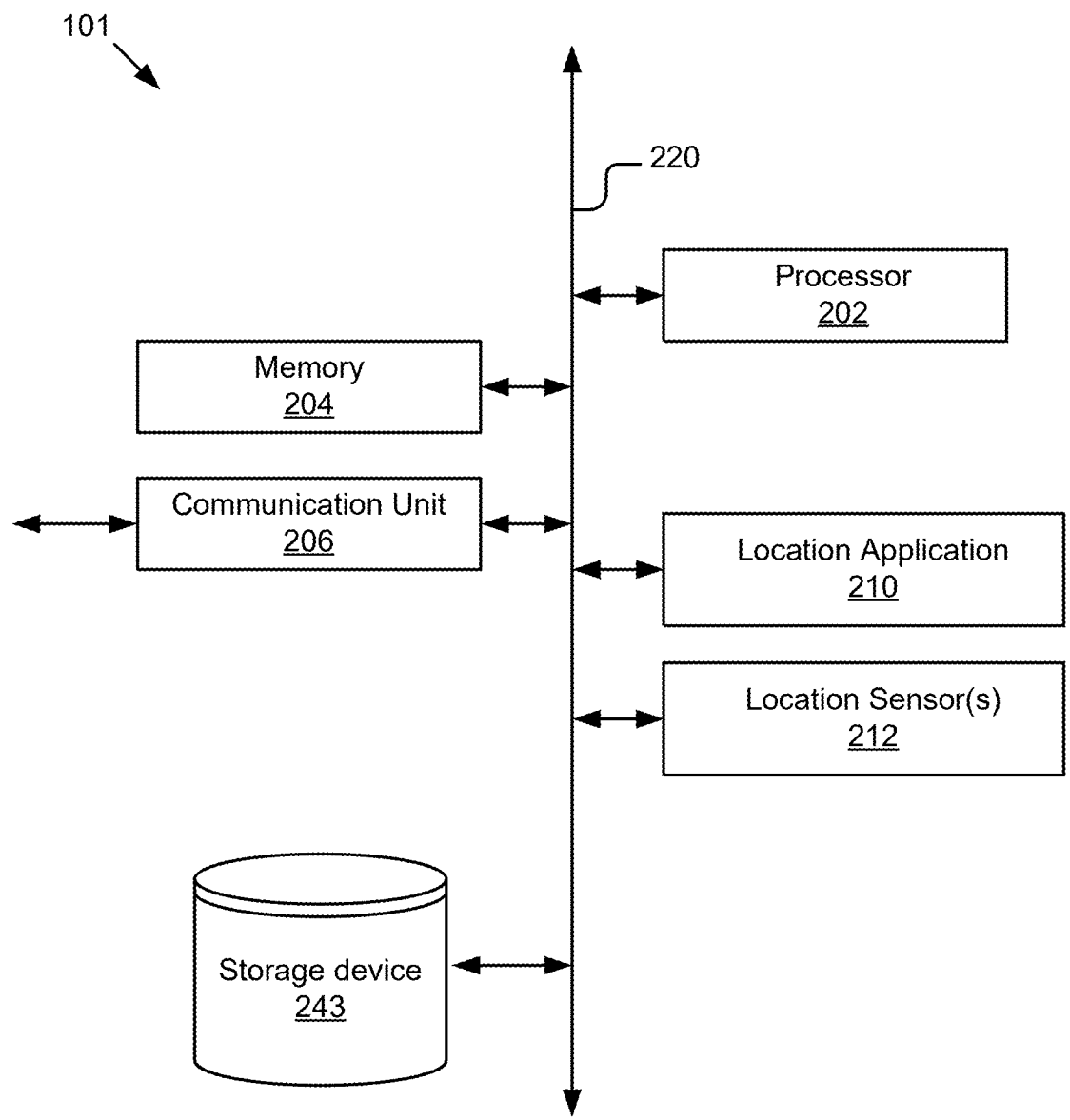
FIG. 2 is a block diagram illustrating an example computing device.

FIG. 2 is a block diagram illustrating an example computing device 101. As depicted, the computing device 101 may include a processor 202, memory 204, communication unit 206, location application 210, location sensor(s) 212, and a storage device 243 which are communicatively coupled by a communications bus 220. However, it should be understood that the computing device 101 is not limited to such and may include other elements, including, for example, a display (not shown) and/or an input device (not shown).

The processor 202 may execute software instructions by performing various input/output, logical, and/or mathematical operations. The processor 202 has various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores.

The memory 204 is a non-transitory computer-readable medium that is configured to store and provide access to data to the other elements of the computing device 101. In some implementations, the memory 204 may store instructions and/or data that may be executed by the processor 202. For example, the memory 204 may store the location application 210. The memory 204 is also capable of storing other instructions and data, including, for example, an operating system, hardware drivers, other software applications, data, etc. The memory 204 may be coupled to the bus 220 for communication with the processor 202 and the other elements of the computing device 101.

The communication unit 206 may include one or more interface devices (I/F) for wired and/or wireless connectivity with the network 105 and/or other devices. In some implementations, the communication unit 206 may include transceivers for sending and receiving wireless signals. For instance, the communication unit 206 may include radio transceivers for communication with the network 105 and for communication with nearby devices using close-proximity (e.g., Bluetooth®, NFC, etc.) connectivity. In some implementations, the communication unit 206 may include ports for wired connectivity with other devices. For example, the communication unit 206 may include a CAT-5 interface, Thunderbolt™ interface, FireWire™ interface, USB interface, etc. In further implementations, the Communication Unit 206 may include one or more ultrawideband Bluetooth antenna that can transmit and receive signals to other Bluetooth enabled devices. In further implementations, a directional array of ultrawideband Bluetooth antenna can be used to transmit and receive signals to other devices in order to accurately create a mesh mapping.

In some implementations, the computing device 101 may include a display (not shown) that may display electronic images and data output by the computing device 101 for presentation to a user. The display may include any conventional display device, monitor or screen, including, for example, an organic light-emitting diode (OLED) display, a liquid crystal display (LCD), etc. In some implementations, the display may be a touch-screen display capable of receiving input from one or more fingers of a user. For example, the display may be a capacitive touch-screen display capable of detecting and interpreting multiple points of contact with the display surface. In some implementations, the computing device 101 may include a graphics adapter (not shown) for rendering and outputting the images and data for presentation on display. The graphics adapter (not shown) may be a separate processing device including a separate processor and memory (not shown) or may be integrated with the processor 202 and memory 204.

In some implementations, the computing device 101 may include an input device (not shown) that may include any device for inputting information into the computing device 101. In some implementations, the input device may include one or more peripheral devices. For example, the input device may include a keyboard (e.g., a QWERTY keyboard), a pointing device (e.g., a mouse or touchpad), microphone, a camera, etc. In some implementations, the input device may include a touch-screen display capable of receiving input from the one or more fingers of the user. For instance, the functionality of the input device and the display may be integrated, and a user of the computing device 101 may interact with the computing device 101 by contacting a surface of the display using one or more fingers. In this example, the user could interact with an emulated (i.e., virtual or soft) keyboard displayed on the touch-screen display by using fingers to contact the display in the keyboard regions.

The location application 210 may include software and/or logic for processing location data received from the location sensor(s) 212 and signals, such as Bluetooth signals, for mesh mapping from the communication unit 206. In some implementations, the location application 210 may process the location data and determine which location data 210 is being requested by the mapping server 103. In further implementations, the location application 210 may process the signal data from the communication unit 206 in order to determine which data points should be sent to the mapping server 103 for mesh mapping. In further implementations, the location application 210 may follow a schedule or request for when to submit location data via the communication unit 206 to the mapping server 103. In further implementations, the location application 210 may detect that a location is within a tracking area, such as entering a geofence, and begin sending location data to the mapping server 103. In some implementations, the location application 210 may be configured to generate a graphical user interface for display on the display screen.

The location sensor(s) 212 may include sensing device(s) that are capable of detecting a location and/or environment of the computing device 101. Non-limiting example sensing device(s) include a geolocation sensor(s) (e.g., GPS transceivers, Bluetooth transceivers, Global Navigational Satellite System (GLONASS) transceivers, ultra-wideband sensor, radio-positioning sensor, Real-time Location System (RTLS) sensor, RFID sensor, radio beacons, ultrasound identification, ultrasonic ranging, wide-over-narrow band, wireless local network location, etc.) accelerometer, gyroscope, proximity sensor, etc. Other types of sensors are also contemplated. The location sensor(s) 212 may be configured to provide coordinate data to the location application 210.

The storage device 243 is an information source for storing and providing access to stored data, such as a database of maps, historical location data, user profile information, object data, location sensor(s) 212, calibration data, and/or any other information generated, stored, and/or retrieved by the location application 210. In some implementations, some of the location data gathered by the location sensor(s) 212 may be stored on the storage device 243 before being sent to the mapping application 310.

In some implementations, the storage device 243 may be included in the memory 204 or another storage device coupled to the bus 220. In some implementations, the storage device 243 may be or included in a distributed data store, such as a cloud-based computing and/or data storage system. In some implementations, the storage device 243 may include a database management system (DBMS). For example, the DBMS could be a structured query language (SQL) DBMS. For instance, storage device 243 may store data in an object-based data store or multi-dimensional tables comprised of rows and columns, and may manipulate, i.e., insert, query, update, and/or delete, data entries stored in a verification data store using programmatic operations (e.g., SQL queries and statements or a similar database manipulation library). Additional characteristics, structure, acts, and functionality of the storage device 243 is discussed elsewhere herein.

Figure 3:
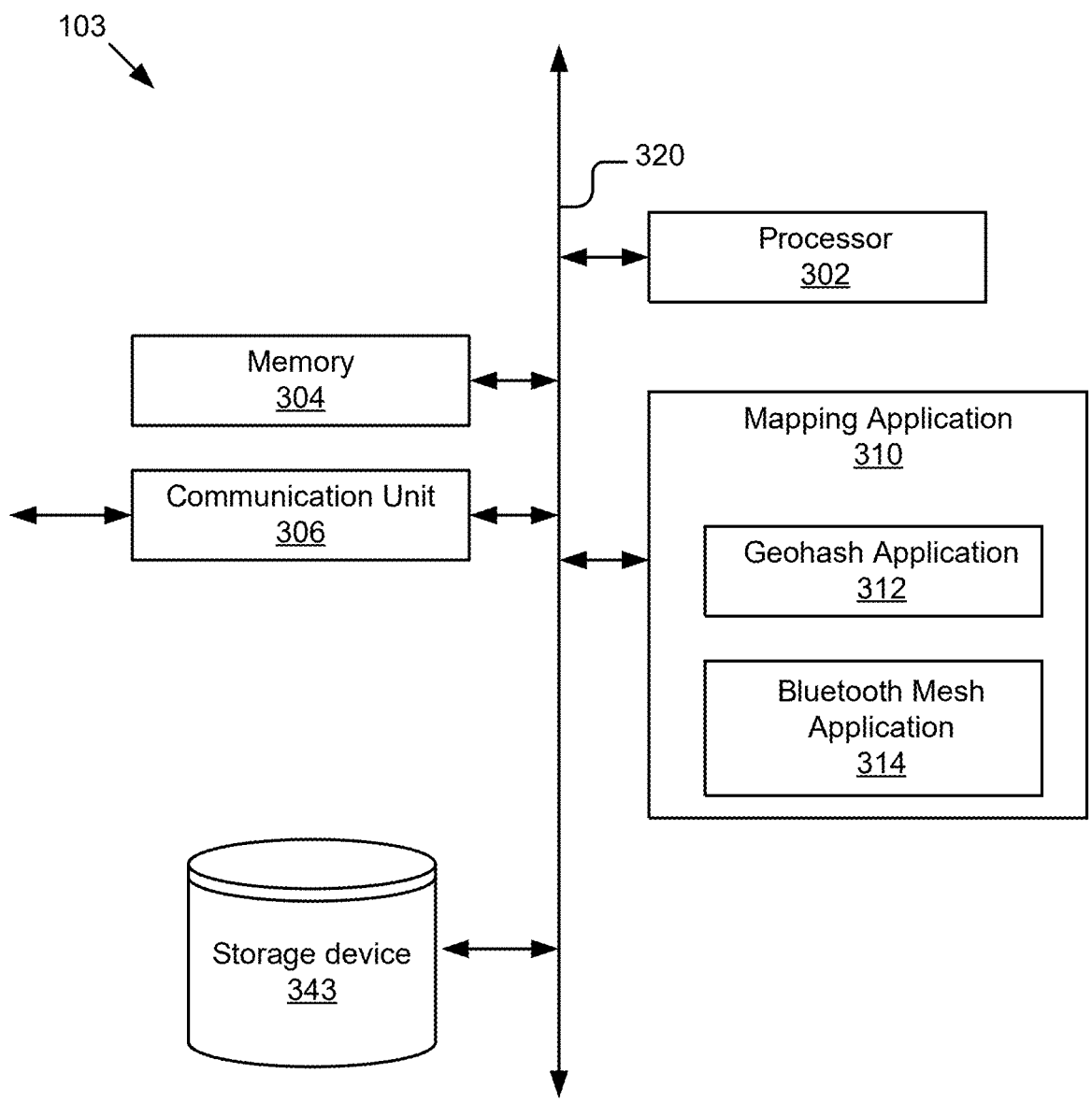
FIG. 3 is a block diagram illustrating an example mapping server.

FIG. 3 is a block diagram illustrating an example mapping server 103. As depicted, the mapping server 103 may include a processor 302, memory 304, communication unit 306, mapping application 310, and a storage device 343 which are communicatively coupled by a communications bus 320.

The processor 302 may execute software instructions by performing various input/output, logical, and/or mathematical operations. The processor 302 has various computing architectures to process data signals including, for example, a complex instruction set computer (CISC) architecture, a reduced instruction set computer (RISC) architecture, and/or an architecture implementing a combination of instruction sets. The processor 302 may be physical and/or virtual, and may include a single core or plurality of processing units and/or cores.

The memory 304 is a non-transitory computer-readable medium that is configured to store and provide access to data to the other elements of the mapping server 103. In some implementations, the memory 304 may store instructions and/or data that may be executed by the processor 302. For example, the memory 304 may store the mapping application 310. The memory 304 is also capable of storing other instructions and data, including, for example, an operating system, hardware drivers, other software applications, data, etc. The memory 304 may be coupled to the bus 320 for communication with the processor 302 and the other elements of the mapping server 103.

The communication unit 306 may include one or more interface devices (I/F) for wired and/or wireless connectivity with the network 206 and/or other devices. In some implementations, the communication unit 105 may include transceivers for sending and receiving wireless signals. For instance, the communication unit 306 may include radio transceivers for communication with the network 105 and for communication with nearby devices using close-proximity (e.g., Bluetooth®, NFC, etc.) connectivity. In some implementations, the communication unit 306 may include ports for wired connectivity with other devices. For example, the communication unit 306 may include a CAT-5 interface, Thunderbolt™ interface, FireWire™ interface, USB interface, etc.

The storage device 343 is an information source for storing and providing access to stored data, such as a database of maps, historical location data, user profile information, object data, location sensor(s) 212 calibration data, and/or any other information generated, stored, and/or retrieved by the mapping application 310.

In some implementations, the storage device 343 may be included in the memory 304 or another storage device coupled to the bus 320. In some implementations, the storage device 343 may be or included in a distributed data store, such as a cloud-based computing and/or data storage system. In some implementations, the storage device 343 may include a database management system (DBMS). For example, the DBMS could be a structured query language (SQL) DBMS. For instance, storage device 343 may store data in an object-based data store or multi-dimensional tables comprised of rows and columns, and may manipulate, i.e., insert, query, update, and/or delete, data entries stored in a verification data store using programmatic operations (e.g., SQL queries and statements or a similar database manipulation library). Additional characteristics, structure, acts, and functionality of the storage device 343 is discussed elsewhere herein. In some implementations, the storage device 343 may be configured to cryptographically hash sensitive and/or private data that is collected from users based on the users opting into sharing the sensitive and/or private data with the mapping server 103.

The mapping application 310 may include software and/or logic for receiving location points, generating a geohash of the location points, and analyzing the densities for various determinations. The mapping application 310 may include a geohash application 312 and a Bluetooth mesh application 314. The elements 312 and 314 may be communicatively coupled by the bus 320 and/or the processor 302 to one another and/or the other elements 304, 306, and/or 343 of the mapping server 103. In some implementations, one or more of the elements 312 and 314 are sets of instructions executable by the processor 302 to provide their functionality. In some implementations, one or more of the elements 312 and 314 are stored in the memory 304 of the mapping server 103 and are accessible and executable by the processor 302 to provide their functionality. In any of the foregoing implementations, these components 312, and 314 may be adapted for cooperation and communication with the processor 302 and other elements of the mapping server 103.

The geohash application 312 includes software and/or logic for processing the location data and generating a geohash. In some implementations, the geohash application 312 may plot location data related to one or more computing devices 101 in real-time (or substantially real-time, meaning the time it takes to receive real-time notifications, process the notifications, and display the updated data) on a grid that overlays a graphical depiction of a map (e.g., a geohash). In some implantations, the geohash application 312 may generate visualizations to represent density of location data at specific points in the geohash. The geohash application 312 may be coupled to the storage device 343 via the bus 320 to store, retrieve, and otherwise manipulate data stored therein.

The Bluetooth mesh application 314 includes software and/or logic for analyzing the signal strength and inferred distances between different computing devices 101a-101n within a tracking area and determining a Bluetooth mesh using the signal strengths and inferred distances. The Bluetooth mesh application 314 may be coupled to the geohash application 312 via the processor 302 and/or the bus 320 to receive the heat map. The Bluetooth mesh application 314 may use standard and/or complex algorithms to compare various signal strength connections and inferred distances between computing devices 101a-101n in order to determine an accurate location point of the computing device 101a. In further implementations, the Bluetooth mesh application 314 may employ machine-learning algorithms to make location determinations. For example, the Bluetooth mesh application 314 may analyze the mesh mapping and/or the geohash and determine that a position that historically has been mapped to include users moving through the position currently does not have any users moving through the position. The Bluetooth mesh application 314 may use that determination along with another determination that users are moving through nearby positions as expected based on the historically data to make the location determination that the position is currently closed in real-time. In further implementations, the Bluetooth mesh application 314 may make location determinations that include wait-times or other line related determinations as described elsewhere herein. In further implementations, the Bluetooth mesh application 314 may be used to infer when two or more computing devices 101 come into contact with each other.

FIG. 4 is an example tracking area 400. In this example tracking area, a first user point 404a and a second user point 404b are shown. The user points represent users that are operating computing devices 101 and are sending location data to the mapping server 103. The example tracking area also depicts one or more other devices that are operating as beacons 406a-406c. In some implementations, these beacons may be a class of Bluetooth Low Energy (BLE) devices that broadcast their identifier to other nearby devices. The computing devices 101 of the user points 404a and 404b are capable of detecting the identifier of the beacons 406a-406c as they are broadcast and when the user points 404 are within range of the beacons 406.

As a user point 404 enters a tracking area 402 the location application 210 may begin sending location data to the mapping server 103. In some implementations, the location application 210 may become active once the location application 210 determines that the computing device 101 has entered a tracking area, such as geofence 402 as shown in FIG. 4. A geofence 402 may be a set area within a tracking area that has been previously identified and mapping by the mapping server 103. When the computing device 101 enters within the coordinates of the geofence 402, the location application 210 may activate and begin operating. It should be understood that the geofence 402 can be any shape of mapping area and may be manually or automatically created by the mapping sever 103 for different tracking areas. By limiting the location application 210 to only send location data when within a tracking area, the bandwidth and storage capacities of the mapping application 103 and computing device 101 can be optimized. Additionally, the battery life of the computing device 101 may be optimized by only tracking the location of the computing device 101 when within the tracking area, such as the geofence 402.

Figure 4A:
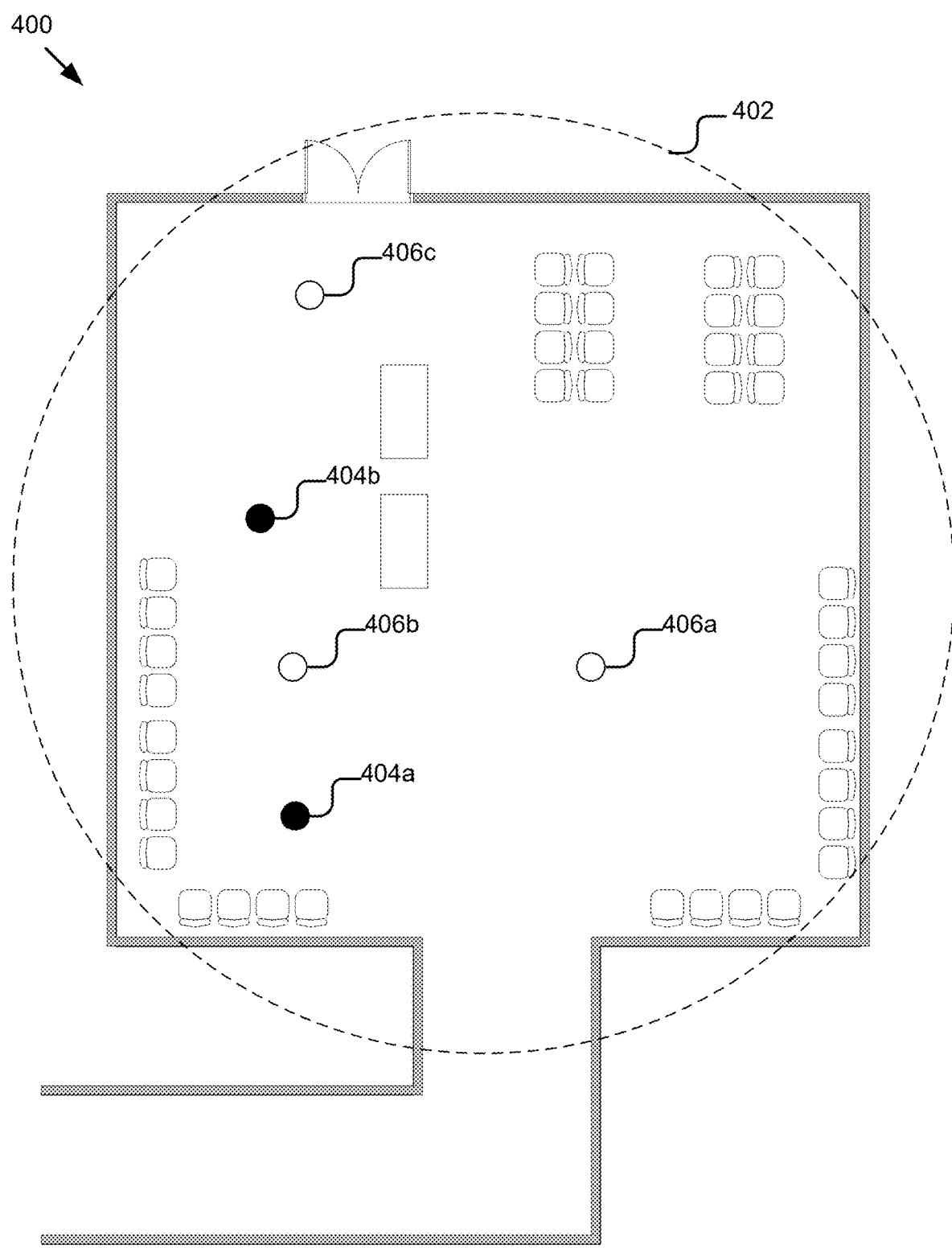
FIGS. 4A-4D are an example graphical implementation of device localization using mesh mapping in a tracking area.

As shown in FIG. 4A, the mapping server 103 may determine a location of the user point 404 based on the location data being sent by the location application 210. The location data may be based on the GPS coordinates of the computing device 101 or the triangulation of the location of the computing device 101 with various signal towers as described elsewhere herein. In some implementations, the location application 210 may filter out location data that exceeds a threshold accuracy or meets other inaccuracy parameters, such as weak signal strength, being clearly erroneous, etc. The location application 210 may then send the location points that meet the filter requirements to the mapping server 103 and the mapping server 103 may determine the location of the user point 404 based on the location data sent by the computing device 101 at that user point 404. The location points may be sent periodically to the mapping server, such as every five seconds, ten seconds, etc. in order to provide location tracking in substantially real-time. When the location points are being collected from computing devices 101 in areas where the accuracy may suffer, such as within a building, etc. The location points often show that the user point 404 is moving around in an area, even when the user of the computing device 101 is not moving. These "bouncing" location points indicate an inaccuracy in the collected location data of the user points 404. Based on the "bouncing" or potentially inaccurate user points, the mapping server 103 needs to determine an accurate location point (that exceeds threshold accuracy) from the plurality of location points received from the user points 404.

Figure 4B:
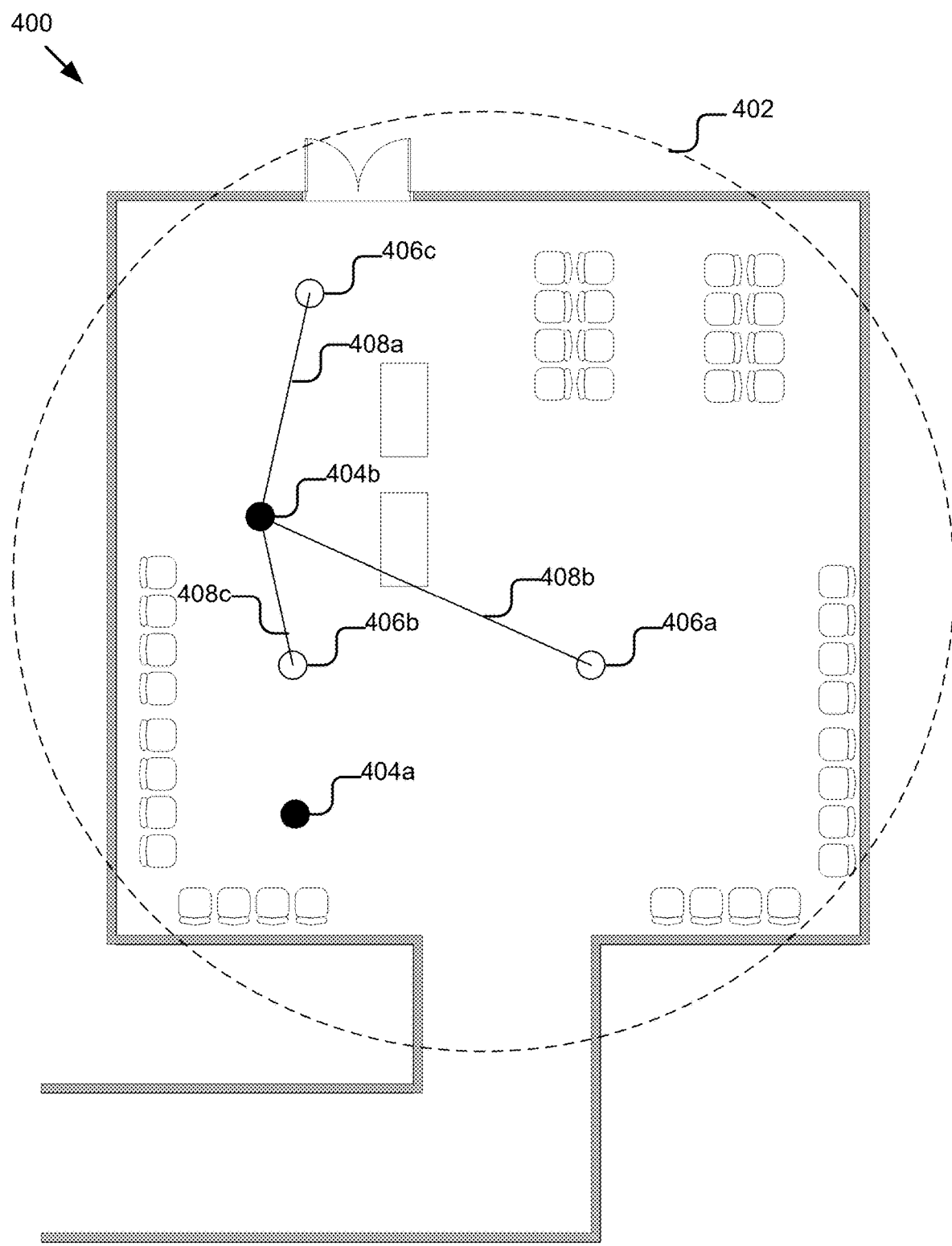

FIG. 4B shows the tracking area 400 with the first user points 404a and the second user point 404b. As shown in this example, the second user point 404b is creating a mesh mapping with the beacons 406a-406c as depicted by the example signal lines 408a-408c. It should be understood that the example signal lines 408 are merely illustrative of a wireless signal that is being transmitted and received between the different points. The user point 404b is creating the mesh mapping by ranging one or more of the beacons within the proximity of the communication unit 206. This ranging of the one or more beacons is achieved based on whether the location application 210 is operating in the foreground of the computing device 101 or the background of the computing device 101.

When the location application 101 is operating in the foreground of the computing device 101, the developer constraints allow the Bluetooth antenna of the communication unit 206 to range one or more of the beacons 406 and determine proximate values for the nearby beacons. The ranging takes the power level received from the Bluetooth antenna for each beacon that is transmitting an identifier and receiving an advertisement of the communication unit 206. When the location application 101 is in the foreground, the power level of the received signals is enough to determine a distance between the computing device 101 and each of the ranged beacons 406. For example, if the location application 101 is in the foreground for user point 404b, the communication unit 206 can range the first beacon 406c as being an approximate 7-8 feet away and the 406c beacon may be a wearable smart watch that is transmitting a passive Bluetooth identifier. The location application 101 can collect the ranges and approximate distances of each of the beacons to the user point 404 and create a distance between each point for a mesh mapping overlay, which may be referred to as a Bluetooth mesh.

When the location application 101 is operating in the background of the computing device 101, some developer systems have a constraint that the Bluetooth antenna cannot actively advertise beacon data and range the beacons 406. Therefore, when the location application 101 is operating in the background of the computing device 101, the read the received signal strength indicator (RSSI) value from the computing device 101 at the user point 404. The location application 101 may then use the RSSI value for the proximate beacons and calculate an estimated mesh mapping. The location application 101 is able to determine distances between the computing device 101 and proximate beacons 406 when the location application 101 is in both the foreground and background and able to seamlessly switch between the two methods of capturing range data for the beacons as the location application 101 switches between the foreground and background. In some implementations, the location application 101 is able to prioritize the more accurate range data that is received when in the foreground and use that to create a more accurate mesh mapping as the location application 101 switches between foreground and background.

In some implementations, the mesh mapping data may represent and send mesh mappings to the mapping server 103 that indicate the proximity of various beacons 406 over periods of time, such as ten second intervals, etc. The mesh mapping may indicate based on signal strengths whether a beacon is in an immediate proximity, up to about three feet, a near proximity, up to about seven feet, a far proximity between seven and nine feet, or an unknown proximity. Using these proximity determinations, the mesh mapping can be used by the mapping server 103 when compared to the location points mapping in order to identify an accurate location point.

For example, if the location points received at a first point in time show the user point 404b at one point and the location point at a second point in time show the user point 404b in another place fifteen feet away from the first point. Either one of the points is inaccurate, or the user represented by user point 404b moved. If the mesh mapping indicates that the distances between the user point 404b and the beacons 406a-406c were similar (e.g., within the expected margin of error for a point that isn't moving) for both the first point in time and the second point in the time, then the Bluetooth mesh application 314 can indicate that one of the location points is inaccurate. If an additional period of sampling is performed in which the location point at the third period of time matches with the location point of the first period of time (over a span of fifteen seconds) and the mesh mapping has not changed for the third period of time, then the Bluetooth mesh application 314 can infer that the first and third location points are accurate and the second location point is inaccurate and can be ignored.

In practice, this inference is optimized using the mapping server 103 and the computations that can only be performed by a computer in substantially real-time, as both user points 404 and the beacons 406 are mobile devices being moved by various users and the points do not remain stationary. Machine learning algorithms can also be employed to further refine the small changes in the location points and mesh mappings as the devices are moved by users and predictive modeling can be employed to speed up the processing of identifying the accurate location points. As each user moves through the tracking area and various beacons are ranged, each of those data points may be moving and the Bluetooth mesh application 314 and mapping server 103 require continuous determinations to identify which beacon ranges are useful for mesh mapping and which location points are inaccurate and should be ignored for location determinations. The mapping server 103 has been optimized to perform these determinations in substantially real-time.

Figure 4C:
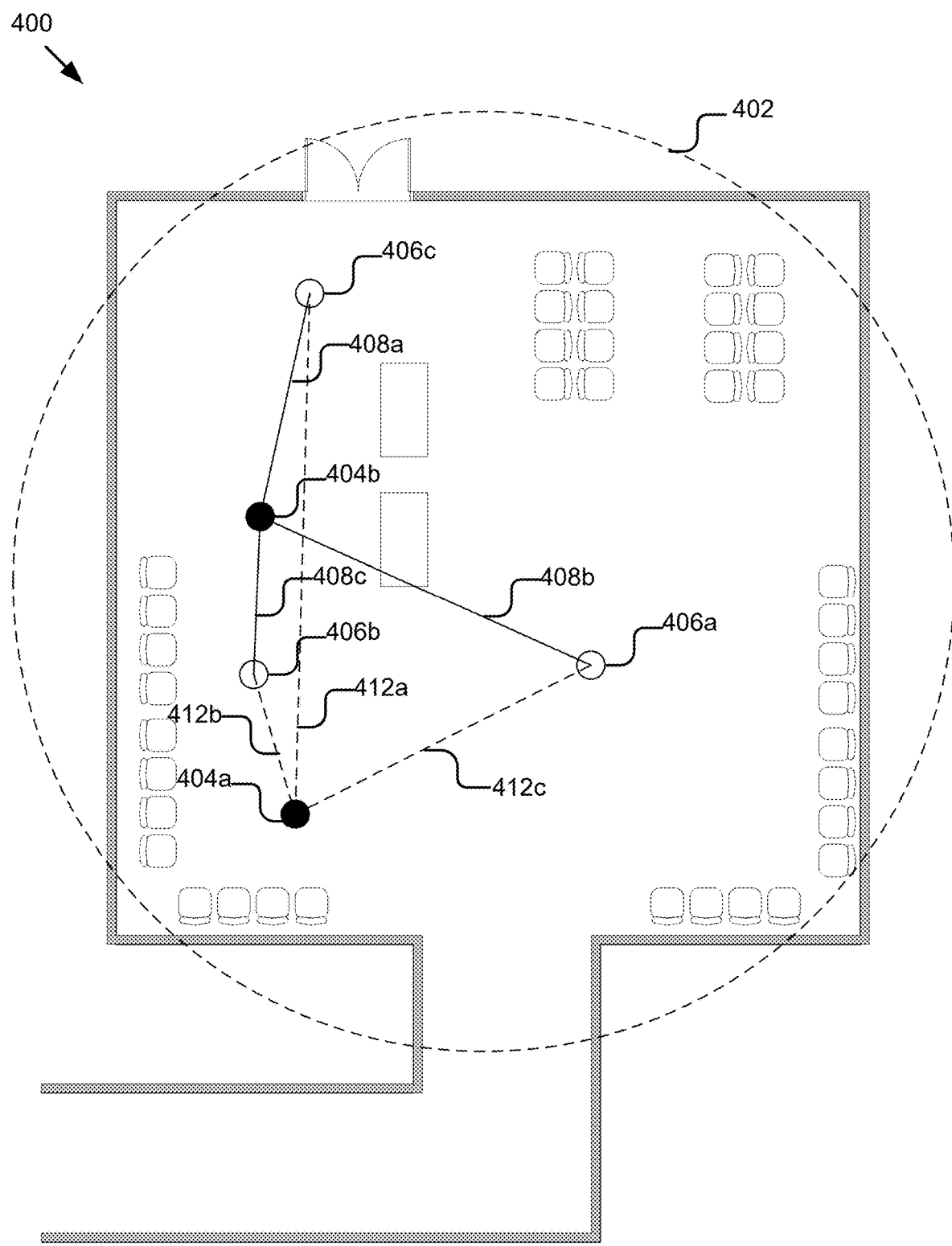

FIG. 4C depicts the first user point 404a adding additional mesh mapping by connecting to the beacons 406a-406 using the example signal lines 412. It should be understood that the example signal lines 412 are merely illustrative of a wireless signal that is being transmitted and received between the different points. As shown, the mesh mapping ranges the and infers the distance between the user point 404a and the beacons 406a-406c as described above. This additional mesh mapping can be added to the mesh mapping generated by the Bluetooth mesh application 314. By adding in all of the mesh mappings from the various user points 404, a full mesh mapping of the tracking area can be created that ranges each of the user points 404 to proximate beacons and in substantially real-time can be used by the mapping server to verify which location points of the user points 404a and 404b are accurate location points.

The Bluetooth mesh application 314 may also determine which beacon ranges are erroneous over the collecting period. For example, if the computing device 101 of the user represented by 404a ranges a beacon (not shown) that is heading in the opposite direction from the user, then for a single (or very short) sample period, the range of that beacon is included in the mesh mapping, but the Bluetooth mesh application 314 may choose to ignore or identify the directionality of that beacon range in order to create an accurate mesh mapping. Once a single accurate location point of either the user point 404a or 404b has been identified, then the mapping server 103 can use that accurate location point to map the location points of the other user points 404 relative to that location point, using either the location points of that other user point 404 and/or also employing the mesh mapping and or mesh connections between the different user points 404.

Figure 4D:
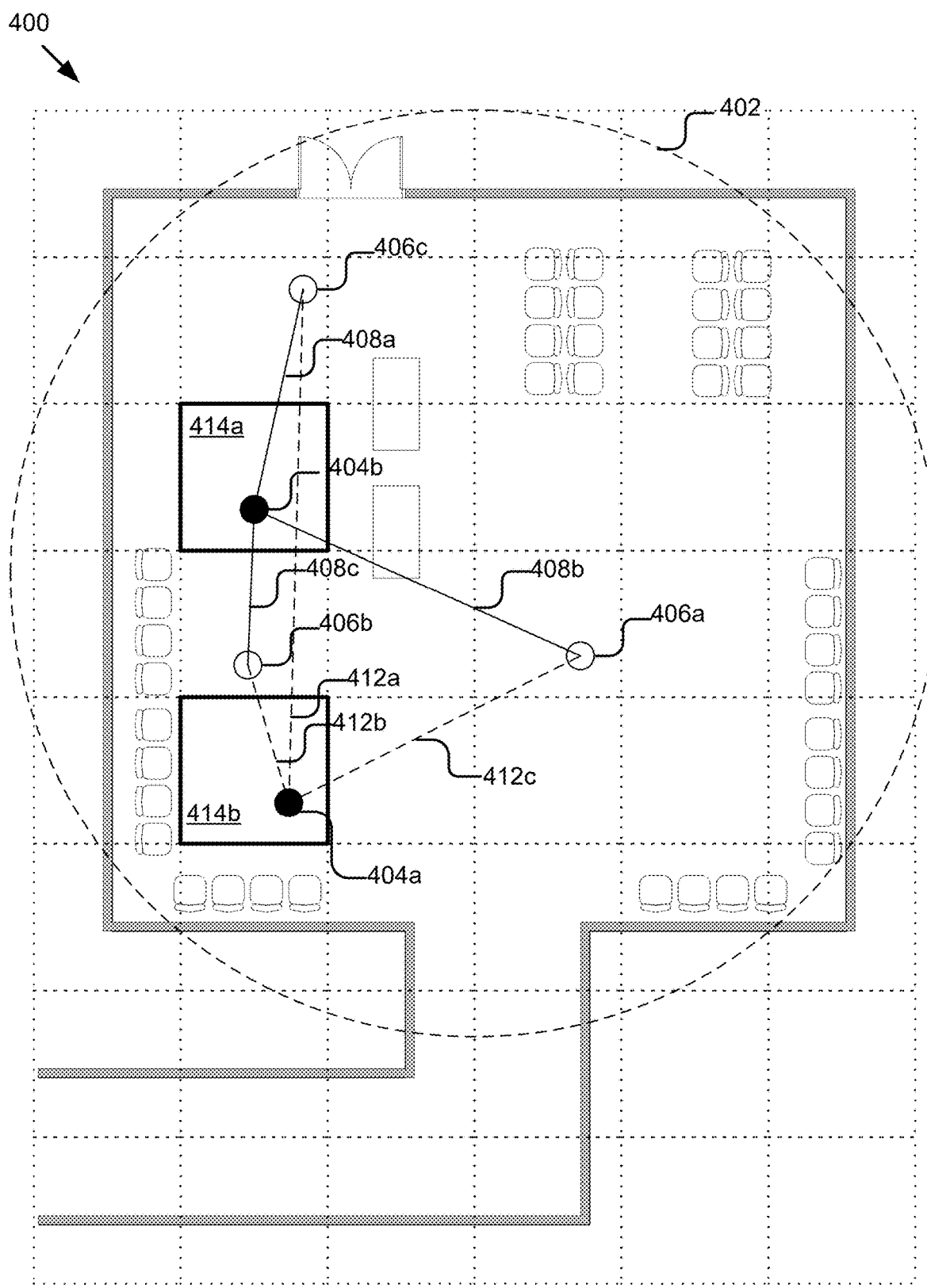

In some implementations, as shown in FIG. 4D, a geohash may also be performed on the tracking area. The geohash may divide the tracking area into grid sections and may categorize location points as being within specific grid sections, such as grid section 414a or grid section 414b. By breaking the tracking area up into the geohash, a geohash overlay can be used to quickly map the tracking area in substantially real time. Rather than having to map the location points of the user points 404a and 404b into the exact locations of the tracking area, the geohash application 312 just maps the location points into the area of the corresponding grid section 414. The geohash grid sections allow for faster processing of the location data by the mapping server and the dimensions of the geohash grid sections can be determined based on a location accuracy of the application. For example, if the mapping server 103 is determining where users are grouped into lines or waiting to move through an area, the grid sections may be six feet by six feet as the accuracy is lower where the users are moving slowly through a line. Whereas, when users are making a decision regarding which line to queue up in and all of the starting points for the queues are within six feet of each other, that geohash overlay may be three feet by three feet to accurately identify which line each user is queued into.

In some implementations, once a location point of a user point 404 has been mapped into a grid section 414 of the geohash, a density may be performed for that grid section and/or adjacent grid sections over a period of time. As the densities change on different grid sections 414 and adjacent grid sections, the throughput and changes in how computing devices 101 move through a tracking area can be determined. It should be understood that these mesh mapping for device localization allows for an accurate location point to be identified while inaccurate location points are also being received. Using the mesh mapping, without deploying additional hardware, a user of a computing device 101 can provide both location points of their device and beacon ranges to proximate BLE devices that are not connected to the mapping server 103 or the location applications 210. These BLE devices or other beacons are capable of passively broadcasting an identity, such as for connection purposes and the signal of this identity can be used for range determinations. This is additionally advantageous as it can range beacons that already exist in the tracking area from other users that have not downloaded or accepted the location application 210 on their computing device 101 or other BLE device. This allows for more data to be actively gathered and is not as dependent on only the users of the application to collect data points for mesh mapping.

In some implementations, a ultrawideband Bluetooth sensors (UWB) may be used. An UWB may transmit and receive signals from other UWB or BLE devices and can much more accurately and over a larger distance determine a range between the two. While UWB that are currently used have a single directionality that they can transmit and receive, an array of UWB can be employed within a computing device to provide full directional coverage for determining ranges between the UWB and other devices. By employing the UWB, more accurate mesh mapping can be obtained which allow for more precise device localization using the existing location data points.

Figure 5:
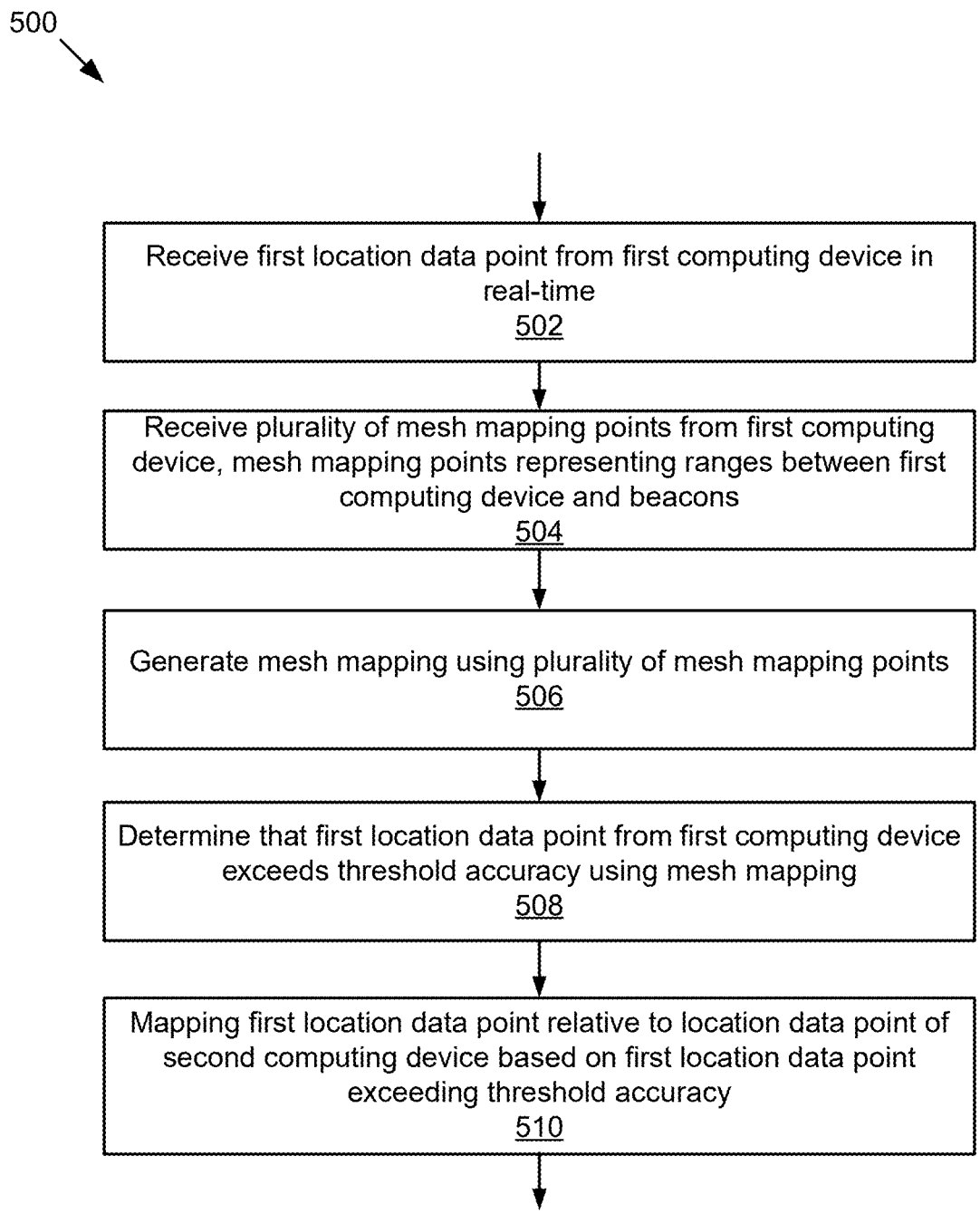
FIG. 5 is a flowchart of an example method for device localization using mesh mapping.

FIG. 5 is a flowchart of an example method 500 for device localization using mesh mapping. At 502, the mapping server 103 may receive first location data points from a first computing device in real-time. These first location data points may be latitude and longitude coordinates of the first computing device 101 that may be captured by the location sensor 212. In some implementations, the first location data points may be inaccurate based on signal interference, such as from a building or other path loss medium that affects the accuracy of the location sensor 212.

At 504, the mapping server 103 may receive a plurality of mesh mapping pints from the first computing device, the mesh mapping points may represent one or more ranges between the first computing device and one or more beacons. For example, one mapping point may be a range between the first computing device and a smart watch worn by another user in the tracking area. The range may reflect the signal strength between the first computing device and the smart watch. The signal strength may be a Bluetooth signal strength to create a Bluetooth mesh or another contemplated signal that is being advertised by the first computing device and detectable by the smart watch. The smart watch may also separately be advertising an identifier using the Bluetooth signal or BLE. The first computing device may be able to determine the signal strength or RSSI depending on how the signals are being broadcast and received and calculate a range of the smart watch. The first computing device 101 may also be able to determine ranges of other beacons, such as other mobile devices, smart apparel, other computing devices, etc. and create a Bluetooth mesh of the tracking area with ranges between the first computing device 101 and the various signals of the beacons.

At 506, the mapping server 103 may generate the mesh mapping using the plurality of mesh mapping points. In some implementations, the mesh mapping may take into account the different ranges between the first computing device 101 and the beacons as well as other computing devices 101 and their respective ranges to the same and/or other beacons, such as in FIG. 4C. The mapping server 103 may aggregate the ranges of the various mesh mapping points and calculate relative locations of the computing devices.

At 508, the mapping server 103 may determine that the first location data point from the first computing device exceeds a threshold accuracy using the mesh mapping. In some implementations, the mapping server 103 may determine if the first location data point is accurate by comparing the first location data point to an expected location of the first computing device from the mesh mapping. If the comparison is substantially similar, then the mapping server 103 may determine that the first location data point is an accurate data point. If the comparison is different, where the mesh mapping predicts the location of the first computing device in a different location than the first location data point, then the mapping server May assume that the first location data point is inaccurate, such as by having the GPS signal bounce or be affected by buildings, etc.

At 510, the mapping server 103 may map the first location data point relative to the location data point of the second computing device based on the first location data point exceeding the threshold accuracy. The mapping server 103 may be able to determine if the location data points of the computing devices are accurate as compared to the mesh mappings of those predicted computing device locations. If one of the location data points is identified as being an accurate location data point, then the rest of the locations of the other computing devices can be mapped using the mesh mapping relative to the accurate location data point.

It will be appreciated that a sample size of overall data points can be used to represent these location determinations. For example, not every computing device 101 in an area needs to be sending location data to the mapping server 103 in order for location determinations to be made. Over time and as models are tracked and analyzed, relatively small, consistent sample sizes of location data can be used to make location determinations. In further implementations, machine learning and predictive modeling can be used to further make the location determinations using the real-time and/or historic location data.

This technology yields numerous advantages including, but not limited to, providing real-time accurate location points of a computing device 101 even when within building or other historical locations where GPS location suffers. This allows a mapping of computing devices in an area to be more accurate, when at least one computing device has a known location point and the other computing devices can be accurately mapped relative to the accurate location point. This allows for further determinations, such as throughput and wait time to be accurately determined within buildings and other areas. This allows a user to more efficiently manage time by knowing how long it will take to move around an area and where congestion or slower flows of traffic may be present in real-time. By using the historical data over time combined with the real-time location data, the mapping server 103 is able to continuously provide greater levels of detail and suggestion regarding location determinations and suggested routes. The information may be valuable for managing officials, such as city officials, police departments, transit services, etc. to identify large groups of users and the overall flow and movement of users.

It should be understood that the above-described example activities are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMS, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
receiving a first location data point from a first computing device in real-time, the first location data point being sent responsive to an application running in a background on the first computing device;
receiving a second location data point from a second computing device in real-time, the second computing device being within a first signal distance of the first computing device;
receiving a third location data point from a third computing device in real-time, the third computing device being within a second signal distance of the first computing device;
receiving a plurality of mesh mapping points from the first computing device, the mesh mapping points representing ranges calculated from received signal strength indicator values between the first computing device and one or more separate computing devices, the one or more separate computing devices including the second computing device and the third computing device, the plurality of mesh mapping points including one or more unique identifiers for each of the separate one or more computing devices;
generating a mesh mapping using the plurality of mesh mapping points, the mesh mapping representing the ranges between the first computing device and the one or more separate computing devices represented by the one or more unique identifiers and the mesh mapping including a first range between the first computing device and the second computing device and a second range between the first computing device and the third computing device;
filtering the mesh mapping by determining whether the first range and the second range satisfy one or more inaccuracy parameters, wherein weak signal strength is one inaccuracy parameter of the one or more inaccuracy parameters and wherein determining that the second range does not satisfy the one or more inaccuracy parameters further comprises:
  determining an expected location of the third computing device;
  comparing the third location data point to the expected location; and
  determining that the third location data point is different from the expected location;
responsive to determining that the first range satisfies the one or more inaccuracy parameters, generating a mesh mapping overlay that includes the first range and updating the mesh mapping to include the mesh mapping overlay;
responsive to determining that the second range does not meet the one or more inaccuracy parameters, filtering out the second range to remove the second range from the mesh mapping;
determining that the first location data point from the first computing device exceeds a threshold accuracy using the filtered mesh mapping and the mesh mapping overlay;
determining an updated location of the first computing device responsive to the first location data point exceeding the threshold accuracy, the updated location representing a relative distance between the first computing device and the second computing device using the first range between the first computing device and the second computing device; and updating the filtered mesh mapping to include the updated location of the first computing device.

2. The method of claim 1, wherein the first location data point is a latitude and longitude coordinate.

3. The method of claim 1, wherein the ranges between the first computing device and the one or more separate computing devices represent signal strengths between a transmitted identifier of each of the one or more separate computing devices and the computing device.

4. The method of claim 3, wherein the signal strengths between the transmitted identifier of each of the one or more separate computing devices and the computing device are received using one or more of a Bluetooth Low Energy device and an ultra-wideband Bluetooth device.

5. The method of claim 1, wherein generating the mesh mapping further comprises:

filtering out the ranges between the first computing device and the one or more separate computing devices that do not satisfy a signal strength threshold;

identifying a proximate distance between each of the remaining ranges between the first computing device and the one or more separate computing devices; and updating the mesh mapping overlay to reflect the range of each of the remaining ranges and the first computing device.

6. The method of claim 5, wherein the proximate distance for each of the remaining ranges is categorized as one of immediate, near, and far.

7. The method of claim 1, wherein determining that the first location data point from the first computing device exceeds a threshold accuracy using the filtered mesh mapping and the mesh mapping overlay further comprises:

overlaying the mesh mapping and the mesh mapping overlay on a mapping area of a tracking area;

determining an expected location of the first computing device using the ranges between the first computing device and the one or more separate computing devices;

comparing the expected location of the first computing device to the first location data point; and determining that the comparison between the expected location of the first computing device and the first location data point satisfies a threshold accuracy threshold.

8. The method of claim 7, further comprising:

responsive to determining that the comparison between the expected location of the first computing device and the first location data point does not satisfy the threshold accuracy threshold, identifying the first location data point as an inaccurate location data point.

9. The method of claim 1, wherein the second location data point of the second computing device is received in a same period of time as the first location data point and wherein updating the filtered mesh mapping to include the updated location of the first computing device further comprises:

mapping the first location data point in a map of a tracking area;

determining a relative location of the second computing device from the filtered mesh mapping; and mapping a location of the second computing device using the relative location of the second computing device from the filtered mesh mapping.

10. A system comprising:

a processor; and a memory storing instructions that, when executed, cause the system to perform instructions including:

receiving a first location data point from a first computing device in real-time, the first location data point being sent responsive to an application running in a background on the first computing device;

receiving a second location data point from a second computing device in real-time, the second computing device being within a first signal distance of the first computing device;

receiving a third location data point from a third computing device in real-time, the third computing device being within a second signal distance of the first computing device;

receiving a plurality of mapping points from the first computing device, the mapping points representing ranges calculated from received signal strength indicator values between the first computing device and one or more separate computing devices, the one or more separate computing devices including the second computing device and the third computing device, the plurality of mapping points including one or more unique identifiers for each of the separate one or more computing devices;

generating a mesh mapping using the plurality of mapping points, the mesh mapping representing the ranges between the first computing device and the one or more separate computing devices represented by the one or more unique identifiers and the mesh mapping including a first range between the first computing device and the second computing device and a second range between the first computing device and the third computing device;

filtering the mesh mapping by determining whether the first range and the second range satisfy one or more inaccuracy parameters, wherein weak signal strength is one inaccuracy parameter of the one or more inaccuracy parameters and wherein determining that the second range does not satisfy the one or more inaccuracy parameters further comprises:

determining an expected location of the third computing device;

comparing the third location data point to the expected location; and determining that the third location data point is different from the expected location;

responsive to determining that the first range satisfies the one or more inaccuracy parameters, generating a mesh mapping overlay that includes the first range and updating the mesh mapping to include the mesh mapping overlay;

responsive to determining that the second range does not meet the one or more inaccuracy parameters, filtering out the second range to remove the second range from the mesh mapping;

determining that the first location data point from the first computing device exceeds a threshold accuracy using the filtered mesh mapping and the mesh mapping overlay;

determining an updated location of the first computing device responsive to the first location data point exceeding the threshold accuracy, the updated location representing a relative distance between the first computing device and the second computing device using the first range between the first computing device and the second computing device; and updating the filtered mesh mapping to include the updated location of the first computing device.

11. The system of claim 10, wherein the ranges between the first computing device and the one or more separate computing devices represent signal strengths between a transmitted identifier of each of the one or more separate computing devices and the computing device.

12. The system of claim 11, wherein the signal strengths between the transmitted identifier of each of the one or more separate computing devices and the computing device are received using one or more of a Bluetooth Low Energy device and an ultra-wideband Bluetooth device.

13. The system of claim 10, wherein generating the mesh mapping further comprises:

filtering out the ranges between the first computing device and the one or more separate computing devices that do not satisfy a signal strength threshold;

identifying a proximate distance between each of the remaining ranges between the first computing device and the one or more separate computing devices; and updating the mesh mapping overlay to reflect the range of each of the remaining ranges and the first computing device.

14. The system of claim 13, wherein the proximate distance for each of the remaining ranges is categorized as one of immediate, near, and far.

15. The system of claim 10, wherein determining that the first location data point from the first computing device exceeds a threshold accuracy using the filtered mesh mapping and the mesh mapping overlay further comprises:

overlaying the mesh mapping and the mesh mapping overlay on a mapping area of a tracking area;

determining an expected location of the first computing device using the ranges between the first computing device and the one or more separate computing devices;

comparing the expected location of the first computing device to the first location data point; and determining that the comparison between the expected location of the first computing device and the first location data point satisfies a threshold accuracy threshold.

16. The system of claim 15, wherein the memory further stores instructions that when executed, cause the system to:

responsive to determining that the comparison between the expected location of the first computing device and the first location data point does not satisfy the threshold accuracy threshold, identifying the first location data point as an inaccurate location data point.

17. The system of claim 10, wherein the second location data point of the second computing device is received in a same period of time as the first location data point and wherein updating the filtered mesh mapping to include the updated location of the first computing device further comprises:

mapping the first location data point in a map of a tracking area;

determining a relative location of the second computing device from the filtered mesh mapping; and mapping a location of the second computing device using the relative location of the second computing device from the filtered mesh mapping.

* * * * *